United States Patent
Wu

(10) Patent No.: US 10,205,545 B2
(45) Date of Patent: Feb. 12, 2019

(54) RESOURCE CREATION METHOD AND APPARATUS

(71) Applicant: ZTE CORPORATION, Shenzhen, Guangdong Province (CN)

(72) Inventor: Hao Wu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 0 days.

(21) Appl. No.: 15/307,949

(22) PCT Filed: Jun. 9, 2014

(86) PCT No.: PCT/CN2014/079534
§ 371 (c)(1),
(2) Date: Oct. 31, 2016

(87) PCT Pub. No.: WO2015/168974
PCT Pub. Date: Nov. 12, 2015

(65) Prior Publication Data
US 2017/0054519 A1 Feb. 23, 2017

(30) Foreign Application Priority Data
May 5, 2014 (CN) .......................... 2014 1 0188511

(51) Int. Cl.
*H04B 17/382* (2015.01)
*H04W 4/70* (2018.01)
*H04L 29/08* (2006.01)

(52) U.S. Cl.
CPC ............ *H04B 17/382* (2015.01); *H04W 4/70* (2018.02); *H04L 67/16* (2013.01)

(58) Field of Classification Search
CPC ............ H04W 4/00–4/02; H04W 4/70; H04B 17/282; H04L 67/16
See application file for complete search history.

(56) References Cited

U.S. PATENT DOCUMENTS

| 2006/0143350 A1* | 6/2006 | Miloushev ............ G06F 9/5016 710/242 |
| 2008/0082640 A1* | 4/2008 | Chang ............... H04L 29/12066 709/220 |

(Continued)

FOREIGN PATENT DOCUMENTS

| CN | 102136934 A | 7/2011 |
| CN | 102855571 A | 1/2013 |
| WO | 2015168974 A1 | 11/2015 |

OTHER PUBLICATIONS

International Search Report and Written Opinion dated Feb. 17, 2015 for International Application No. PCT/CN2014/079534.

(Continued)

*Primary Examiner* — Raymond Dean
(74) *Attorney, Agent, or Firm* — Plumsea Law Group, LLC

(57) ABSTRACT

The present document discloses a method and apparatus for creating a resource. In the above method, receiving a resource creation request from a transmitting end, herein information carried in the resource creation request carries resource creation information corresponding to a resource to be created; and determining whether a first resource name needs to be reallocated to the resource to be created and creating the resource to be created according to the resource creation information. According to the technical solutions provided by the present document, the management of resource names by a CSE is enhanced, and the uniqueness of the resource names is ensured, consequently the application scenarios of an M2M service provider are expanded, and at the same time the duplicated registration of the same resources is avoided.

5 Claims, 2 Drawing Sheets

(56) References Cited

U.S. PATENT DOCUMENTS

2009/0007162 A1* 1/2009 Sheehan ............... G06F 9/5005
                                                    719/331
2016/0088420 A1* 3/2016 Kim ..................... H04L 67/025
                                                    370/328

OTHER PUBLICATIONS

European Search Report dated Feb. 22, 2017 for EP Application No. 14891392.4.
"Machine-to-Machine communications (M2M); Functional architecture", Technical Specification, European Telecommunications Standards Institute (ETSI), 650, Route Des Lucioles; F-06921 Sopia-Antipolis; France, vol. SmartM2M, No. V2.1.1, Oct. 1, 2013.
Rajesh Bhalla et al: This document specifies the functional architecture for the oneM2M Services Platform. ARC-2014-1364-Functional Architecture Spec Proposed Baseline TS-OOOI V0 5 1.ZIP, ONEM2M, vol. WG2—Architecture. ARC, Apr. 29, 2014, pp. 1-329. XP084005919.

* cited by examiner

US 10,205,545 B2

RESOURCE CREATION METHOD AND APPARATUS

CROSS-REFERENCE TO RELATED APPLICATION(S)

This application is the U.S. National Phase application of PCT application number PCT/CN2014/079534 having a PCT filing date of Jun. 9, 2014, which claims the priority of Chinese patent application 201410188511.0 filed on May 5, 2014, the disclosures of which are incorporated herein by reference.

TECHNICAL FIELD

The present document relates to the field of communications, and in particular, to a method and apparatus for creating a resource.

BACKGROUND OF THE RELATED ART

A Machine to Machine, called M2M communication network is composed of various M2M nodes and a bearer network. The M2M nodes communicate with each other through the bearer network. An M2M node may include but is not limited to an application entity or a public service entity. The application entity is a logic unit which actually executes an M2M application, and the public service entity is a logic unit which manages and serves the application.

In the architecture of an M2M system, an application node is an execution node at the end, for example, an intelligent electric meter, a temperature measurement and control sensor, a fire alarm, an intelligent home appliance etc. An intermediate node is a middleware which is connected to the execution node at the end and a server at a network side, for example a gateway. A base node is a server at the network side. Herein an application entity which is registered at the base node is generally management software or a management platform of an M2M service provider.

FIG. 1 is a diagram of an architecture of an M2M system according to the related technology. As shown in FIG. 1, the communication between M2M applications is generally achieved through interaction between Common Service Entities, called CSEs. The premise of the communication is that the M2M applications firstly need to be registered at local CSEs (for example, in FIG. 1, an application entity at an application node needs to be registered at a CSE of an intermediate node, and then the CSE at the intermediate node is a local CSE of the application entity at the application node). Then interaction between the M2M applications can be achieved through communication between the CSEs.

The application node is a physical entity, and the Application Entity, called AE is a logic unit, which is a logic unit that really executes an application on the physical entity, i.e., the application node.

When the AE is registered to the local CSE, the AE needs to provide a security certificate which can identify validity of its own to the local CSE, so that the CSE verifies the AE. Only after the validation is OK, registration can be performed at the local CSE, and meanwhile the AE further needs to provide a registration name suggested by the AE to the local CSE for reference.

Further, the registered application may further create a resource related to the application at the local CSE as a child resource of the resource of the application. For example, after the application is registered, the local CSE will create a resource "application". In order to store data of the application, the application may create a resource "container" under the resource "application", and the resource "container" is used to store the data of the application. The resource "application" is a parent resource of the resource "container", and the resource "container" is a child resource of the resource "application". In a practical operation process, if the child resource is deleted, the parent resource will not be deleted (i.e., the deletion of the child resource does not influence the parent resource). However, as long as the parent resource is deleted, all of the child resources must be deleted.

In the related technology, when an AE creates a resource at a CSE, or when a CSE requests for creating a resource at another CSE, a resource name needs to be provided, and then the CSE which is requested to create a resource will name the created resource according to the received resource name. However, in an M2M application which is practically deployed, various application nodes under an M2M network may be from various different manufacturers, and the various different manufacturers do not coordinate the above resource names with each other. For example, an intelligent television (application node) of manufacturer 1 is arranged in the home of an intelligent home user, and a resource name provided by its application entity AE1 is myTV. Besides, there is an intelligent television of manufacturer 2, and a resource name provided by its application entity AE2 is also myTV. There results in that there are two resources with the same name in the CSE, thereby bringing inconvenience to the management of the resources by the CSE. For example, when an AE requests for updating a resource which is created by the AE, the CSE may modify the two resources with the same name according to the provided resource name, but another resource with the same name should not be updated. In this way, as a result errors will occur in the applications. Therefore, due to the limitation of the related technology, it may result in that the M2M service provider limits application scenarios in order to ensure normal operations. For example, in the above examples, each CSE can only manage one intelligent television.

Thus it can be seen that in the related technology, resource creation information of a resource to be created is not analyzed and processed, which results in a problem that the management executed by the CSE is disordered due to the same name of the resource to be created as that of a resource which has already existed.

SUMMARY

The present document provides a method and apparatus for creating a resource, to at least solve the problem in the related technology that it is not beneficial for a CSE to manage resources due to the same name of the resource to be created as that of a resource which has already existed.

According to an aspect of the present document, a method for creating a resource is provided, including:

receiving a resource creation request from a transmitting end, herein information carried in the resource creation request carries resource creation information corresponding to a resource to be created; and determining whether a first resource name needs to be reallocated to the resource to be created and creating the resource to be created according to the resource creation information.

The resource creation information includes: a second resource name to be used which is provided by the transmitting end, and a resource creation position; and determining whether a first resource name needs to be reallocated to the resource to be created according to the resource creation information includes:

in a case that the transmitting end is verified to have a resource creation authority, determining that there is no resource having the same name as the second resource name in the resource creation position; and creating the resource to be created, herein the name of the resource to be created is the second resource name.

The resource creation information includes: a second resource name to be used which is provided by the transmitting end, and a resource creation position; and determining whether a first resource name needs to be reallocated to the resource to be created according to the resource creation information includes:

in a case that the transmitting end is verified to have a resource creation authority, determining that there is a resource having the same name as the second resource name in the resource creation position; and reallocating the first resource name to the resource to be created and creating the resource to be created, herein the first resource name is different from the second resource name.

The resource creation information includes: a second resource name to be used which is provided by the transmitting end, a resource creation position and a creator; and determining whether a first resource name needs to be reallocated to the resource to be created and creating the resource to be created according to the resource creation information includes:

in a case that the transmitting end is verified to have a resource creation authority, determining that there is a resource having the same name as the second resource name in the resource creation position;

judging whether a creator of the resource with the same name is the same as a creator of the resource to be created;

if no, reallocating the first resource name to the resource to be created and creating the resource to be created, herein the first resource name is different from the second resource name; and if yes, rejecting to create the resource to be created.

After determining whether a first resource name needs to be reallocated to the resource to be created according to the resource creation information, the method further includes:

returning a resource creation response to the transmitting end, herein the first resource name is carried in the resource creation response.

The transmitting end includes one of a Common Service Entity, called CSE and an Application Entity, called AE.

According to another aspect of the present document, an apparatus for creating a resource is provided, including:

a receiving module configured to receive a resource creation request from a transmitting end, herein information carried in the resource creation request carries resource creation information corresponding to a resource to be created; and a processing module configured to determine whether a first resource name needs to be reallocated to the resource to be created and create the resource to be created according to the resource creation information.

The resource creation information includes: a second resource name to be used which is provided by the transmitting end, and a resource creation position; and the processing module includes:

a first determination unit configured to determine that there is no resource having the same name as the second resource name in the resource creation position in a case that the transmitting end is verified to have a resource creation authority; and a first creation unit configured to create the resource to be created, herein the name of the resource to be created is the second resource name.

The resource creation information includes: a second resource name to be used which is provided by the transmitting end, and a resource creation position; and the processing module includes:

a second determination unit configured to determine that there is a resource having the same name as the second resource name in the resource creation position in a case that the transmitting end is verified to have a resource creation authority; and a second creation unit configured to reallocate the first resource name to the resource to be created and create the resource to be created, herein the first resource name is different from the second resource name.

The resource creation information includes a second resource name to be used which is provided by the transmitting end, a resource creation position and a creator; and the processing module includes:

a second determination unit configured to determine that there is a resource having the same name as the second resource name in the resource creation position in a case that the transmitting end is verified to have a resource creation authority;

a judgment unit configured to judge whether a creator of the resource with the same name is the same as a creator of the resource to be created;

a third creation unit configured to reallocate the first resource name to the resource to be created and create the resource to be created when an output of the judgment unit is not the same, herein the first resource name is different from the second resource name; and a rejection unit configured to reject to create the resource to be created when the output of the judgment unit is the same.

The above apparatus further includes:

a response module configured to return a resource creation response to the transmitting end, herein the first resource name is carried in the resource creation response.

With the embodiments of the present document, a resource creation request is received from a transmitting end, herein information carried in the resource creation request carries resource creation information corresponding to a resource to be created; and it is determined whether a first resource name needs to be reallocated to the resource to be created, and the resource to be created is created according to the resource creation information. This solves the problem in the related technology that it is not beneficial for a CSE to manage resources due to the same name of the resource to be created as that of a resource which has already existed. Thereby, the management of resource names by the CSE is enhanced, and the uniqueness of the resource names is ensured, consequently the application scenarios of an M2M service provider are expanded, and at the same time the duplicated registration of the same resources is avoided.

BRIEF DESCRIPTION OF THE DRAWINGS

The accompanying drawings described herein are used to provide a further understanding of the present document, and constitute a part of this application. The schematic embodiments of the present document and the descriptions thereof are used to explain the present document, and do not constitute an improper definition of the present document. In the accompanying drawings.

DETAILED DESCRIPTION

The present document will be described in detail below with reference to accompanying drawings and in conjunction with embodiments. It should be illustrated that the embodiments of the present application and features in the embodiments can be combined with each other without a conflict.

Figures 1, 2:
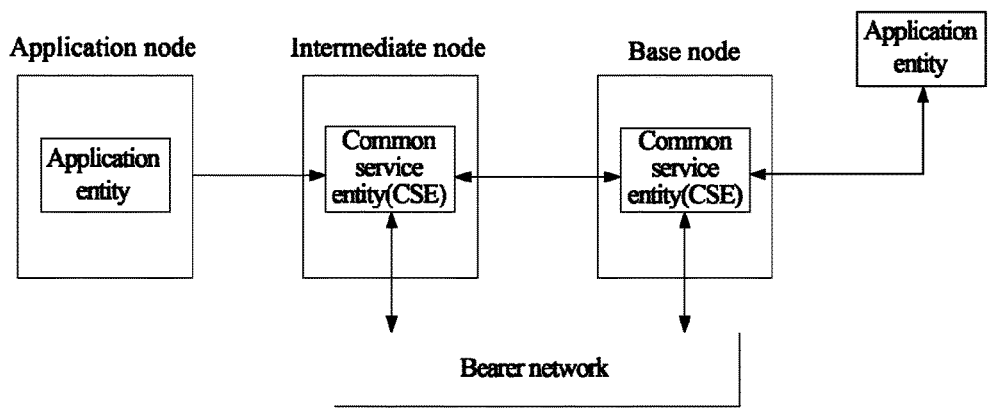
FIG. 1 is a diagram of an architecture of an M2M system according to the related technology.
FIG. 2 is a flowchart of a method for creating a resource according to an embodiment of the present document.

FIG. 2 is a flowchart of a method for creating a resource according to an embodiment of the present document. As shown in FIG. 2, the method may include the following processing steps.

In step S202, a resource creation request is received from a transmitting end. Herein information carried in the resource creation request carries resource creation information corresponding to a resource to be created.

In step S204, it is determined whether a first resource name needs to be reallocated to the resource to be created, and the resource to be created is created according to the resource creation information.

In the related technology, a name of a resource to be created has the same name as that of a resource which has already existed, which is not beneficial for a CSE to manage resources. With the method illustrated in FIG. 2, after a resource creation request is received from a transmitting end, a resource is not created directly according to resource creation information carried in the resource creation request. And instead, it needs to determine whether a first resource name needs to be reallocated to the resource to be created, and create the resource to be created according to the resource creation information. This solves the problem in the related technology that it is not beneficial for a CSE to manage resources due to the same name of the resource to be created as that of a resource which has already existed. Thereby, the management of resource names by the CSE is enhanced, and the uniqueness of the resource names is ensured. Consequently the application scenarios of an M2M service provider are expanded, and at the same time the duplicated registration of the same resources is avoided.

In an alternative implementation process, the above transmitting end may include but is not limited to one of:

(1) Common Service Entity called CSE; and
(2) Application Entity, called AE.

Herein, the above resource creation information may include: a second resource name to be used which is provided by the transmitting end and a resource creation position. In step S204, determining whether a first resource name needs to be reallocated to the resource to be created according to the resource creation information may include the following operations.

In step S1, in a case that the transmitting end is verified to have a resource creation authority, it is determined that there is no resource having the same name as the second resource name in the resource creation position.

In step S2, the resource to be created is created, herein the name of the resource to be created is the second resource name.

In an alternative implementation process, the resource to be created may be created according to a resource type.

In an alternative embodiment, an AE or CSE1 transmits a creation resource request to CSE2, herein information carried in the resource creation request may include but is not limited to:

(1) Resource name: a name which is provided to a CSE to use when a CSE creates a resource;
(2) Resource creation position, i.e., an address of a parent resource of the created resource; and
(3) Resource type.

After receiving the resource creation request, the CSE2 checks whether there is a child resource with the same name as the above resource name in all of child resources in the resource creation position. If no, an application type resource may be created directly, and the resource name thereof is set as the above resource name.

Herein, the above resource creation information may include: a second resource name to be used which is provided by the transmitting end, and a resource creation position; and in step S204, determining whether a first resource name needs to be reallocated to the resource to be created according to the resource creation information may include the following steps.

In step S3, in a case that the transmitting end is verified to have a resource creation authority, it is determined that there is a resource having the same name as the second resource name in the resource creation position.

In step S4, the first resource name is reallocated to the resource to be created and the resource to be created is created. Herein, the first resource name is different from the second resource name.

In an alternative embodiment, the AE or CSE1 transmits a resource creation request to the CSE2. Herein information carried in the resource creation request may include but is not limited to:

(1) Resource name: a name which is provided to a CSE to use when the CSE creates a resource;
(2) Resource creation position, i.e., an address of a parent resource of the created resource; and
(3) Resource type.

After receiving the resource creation request, if there is a child resource with the same name as the resource name in the resource creation request in the resources indicated by the resource creation position, the CSE2 reallocates a resource name which is different from that of the resource to the resource, and creates a resource.

Herein, the above resource creation information may include: a second resource name to be used which is provided by the transmitting end, a resource creation position and a creator. In step S204, determining whether a first resource name needs to be reallocated to the resource to be created and creating the resource to be created according to the resource creation information may include the following operations.

In step S5, in a case that the transmitting end is verified to have a resource creation authority, it is determined that there is a resource having the same name as the second resource name in the resource creation position.

In step S6, it is judged whether a creator of the resource with the same name is the same as the creator of the resource to be created.

In step S7, if no, the first resource name is reallocated to the resource to be created and the resource to be created is created, herein the first resource name is different from the second resource name.

In step S8, if yes, creation of the resource to be created is rejected.

In an alternative embodiment, the AE or CSE1 transmits a resource creation request to the CSE2, herein information carried in the resource creation request may include but is not limited to:

(1) Creator: identity information of the creator (the AE or CSE1 described above);

(2) Resource name: a name which is provided to a CSE to use when the CSE creates a resource;

(3) Resource creation position, i.e., an address of a parent resource of the created resource; and (4) Resource type.

After the CSE2 receives the above resource creation request, if there is already a child resource with the same name as the resource name in the resource creation request in the resources indicated by the resource creation position but creators thereof are different, a resource name which is different from that of the resource is reallocated to the resource, and the resource is created according to the resource type. If there is already a child resource with the same name as the resource name in the resource creation request in the resources indicated by the resource creation position and creators thereof are the same, creation of resources is rejected, and creation failure is indicated in a resource creation response message. In addition, an error cause for the creation failure may also be fed back.

Herein, in step S204, after it is determined whether a first resource name needs to be reallocated to the resource to be created according to the resource creation information, the following operation may also be included.

In step S9, a resource creation response is returned to the transmitting end, herein the first resource name is carried in the resource creation response.

In the above alternative embodiment, the resource name which is newly allocated may also be contained in the resource creation response message, and the resource creation response message is transmitted to the AE or CSE1 by the CSE2.

The above alternative implementation process will be further described below in conjunction with alternative embodiments one to three.

Alternative embodiment one (the AE requests for creating a resource)

1. AE1 at an application node 1 transmits a resource creation request to a local CSE, herein information carried in the resource creation request may include but is not limited to:

(1) Resource type, which is application;
(2) Resource name, which is my application; and
(3) Resource creation position, which is "\\cseRoot".

2. After receiving the resource creation request of the AE1, the local CSE verifies whether the AE1 has a resource creation authority. If yes, the local CSE checks whether there is a child resource with a name of "my application" in multiple child resources in the position of "\\cseRoot". If no such child resource, an application type resource may be directly created, and a resource name thereof may be set as "my application".

3. AE2 at an application node 2 transmits a resource creation request to the local CSE, herein information carried in the resource creation request may include but is not limited to:

(1) Resource type, which is application;
(2) Resource name, which is my application; and
(3) Resource creation position, which is "\\cseRoot".

4. After receiving the resource creation request of the AE2, the local CSE verifies whether the AE2 has a resource creation authority. If yes, the local CSE checks whether there is a child resource with a name of "my application" in all of child resources in the position of "\\cseRoot". If there is such a child resource, the local CSE reallocates a resource name of "my application 2" or "my application a" to the resource requested to be created by the AE2, and the resource name must be different from the existing resource name of "my application", for example, a digit or letter suffix may be added behind the resource name for distinguishing them.

5. The local CSE creates an application type resource for the AE2, and sets the resource name as a resource name which is newly allocated by the local CSE.

6. After the resource is created successfully, the resource name which is newly allocated is contained in the resource creation response message, and the resource creation response message is transmitted to the AE2 by the local CSE.

Alternative embodiment two (the CSE requests for creating a resource)

1. CSE1 at an intermediate node 1 transmits a resource creation request to CSE3 at a base node, herein information carried in the resource creation request may include but is not limited to:

(1) Resource type, which is remote CSE;
(2) Resource name, which is my CSE; and
(3) Resource creation position, which is "\\cseRoot".

2. After receiving the resource creation request of the CSE1, the CSE3 verifies whether the CSE1 has a resource creation authority. If yes, the CSE3 checks whether there is a child resource with a name of "my CSE" in multiple child resources in the position of "\\cseRoot". If no such child resource, a resource of the "remote CSE" type may be directly created, and a resource name thereof may be set as "my CSE".

3. CSE2 at an intermediate node 2 transmits a resource creation request to CSE3, herein information carried in the resource creation request may include but is not limited to:

(1) Resource type, which is remote CSE;
(2) Resource name, which is my CSE; and
(3) Resource creation position, which is "\\cseRoot".

4. After receiving the resource creation request of the CSE2, the CSE3 verifies whether the CSE2 has a resource creation authority. If yes, the CSE3 checks whether there is a child resource with a name of "my CSE" in multiple child resources in the position of "\\cseRoot". If there is such a child resource, the CSE3 reallocates a resource name of "my CSE2" or "my CSEa" to the resource requested to be created by the CSE2. The resource name must be different from the existing resource name of "my application", for example, a digit or letter suffix may be added behind the resource name for distinguishing them.

5. The CSE3 creates a resource of the "remote CSE" type for the CSE2, and sets the resource name thereof as a resource name which is newly allocated by the CSE3.

6. After the resource is created successfully, the resource name which is newly allocated is contained in the resource creation response message, and the resource creation response message is transmitted to the CSE2 by the CSE3.

Alternative embodiment three (considered whether creators are the same)

1. AE1 at an application node 1 transmits a resource creation request to a local CSE, herein information carried in the resource creation request may include but is not limited to:
   (1) Resource type, which is application;
   (2) Resource name, which is my application; and
   (3) Resource creation position, which is "\\cseRoot".
   (4) Creator: AE-ID-1 (assumed that AE-ID-1 is identity information of the AE1).

2. After receiving the resource creation request of the AE1, the local CSE verifies whether the AE1 has a resource creation authority. If yes, the local CSE checks whether there is a child resource with a name of "my application" in multiple child resources in the position of "\\cseRoot". If no such child resource, an application type resource may be directly created, and a resource name thereof may be set as "my application".

3. AE2 at an application node 2 transmits a resource creation request to the local CSE, herein information carried in the resource creation request may include but is not limited to:
   (1) Resource type, which is application;
   (2) Resource name, which is my application; and
   (3) Resource creation position, which is "\\cseRoot"; and
   (4) Creator: AE-ID-2 (assumed that AE-ID-2 is identity information of the AE2).

4. After receiving the resource creation request of the AE2, the local CSE verifies whether the AE2 has a resource creation authority. If yes, the local CSE checks whether there is a child resource with a name of "my application" in all of child resources in the position of "\\cseRoot". If there is such a child resource, the local CSE checks whether creators are the same. In the alternative embodiment, identity information "AE-ID-1" and identity information "AE-ID-2" of two creators are compared, when the comparison result is different, the local CSE reallocates a resource name of "my application 2" or "my application a" to the resource requested to be created by the AE2. The resource name must be different from the existing resource name of "my application", for example, a digit or letter suffix may be added behind the resource name for distinguishing them.

5. The local CSE creates an application type resource for the AE2, and sets the resource name as a resource name which is newly allocated by the local CSE.

6. After the resource is created successfully, the resource name which is newly allocated is contained in the resource creation response message, and the resource creation response message is transmitted to the AE2 by the local CSE.

7. The AE2 at the application node 2 transmits a resource creation request to the local CSE, herein information carried in the resource creation request may include but is not limited to:
   (1) Resource type, which is application;
   (2) Resource name, which is my application;
   (3) Resource creation position, which is "\\cseRoot"; and
   (4) Creator: AE-ID-1 (assumed that AE-ID-1 is identity information of the AE1).

8. After receiving the resource creation request of the AE1, the local CSE verifies whether the AE1 has a resource creation authority. If yes, the local CSE checks whether there is a child resource with a name of "my application" in all of child resources in the position of "\\cseRoot". If there is such a child resource, the local CSE checks whether creators are the same. In the alternative embodiment, identity information "AE-ID-1" and identity information "AE-ID-1" of two creators are compared, when the comparison result is the same, the local CSE rejects to create the resource requested to be created by the AE1, and returns a resource creation response message to the AE1. Herein, "creation error" may be indicated in the response message.

Figure 3:
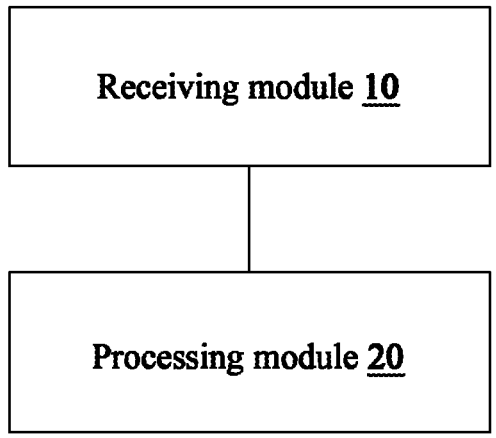
FIG. 3 is a structural block diagram of an apparatus for creating a resource according to an embodiment of the present document.

FIG. 3 is a structural block diagram of an apparatus for creating a resource according to an embodiment of the present document. As shown in FIG. 3, the apparatus for creating a resource may include a receiving module 10 configured to receive a resource creation request from a transmitting end, herein information carried in the resource creation request carries resource creation information corresponding to a resource to be created; and a processing module 20 configured to determine whether a first resource name needs to be reallocated to the resource to be created, and create the resource to be created according to the resource creation information.

The apparatus illustrated in FIG. 3 solves the problem in the related technology that it is not beneficial for a CSE to manage resources due to the same name of the resource to be created as that of a resource which has already existed. Thereby, the management of resource names by the CSE is enhanced, and the uniqueness of the resource names is ensured, consequently the application scenarios of an M2M service provider are expanded, and at the same time the duplicated registration of the same resources is avoided.

Figure 4:
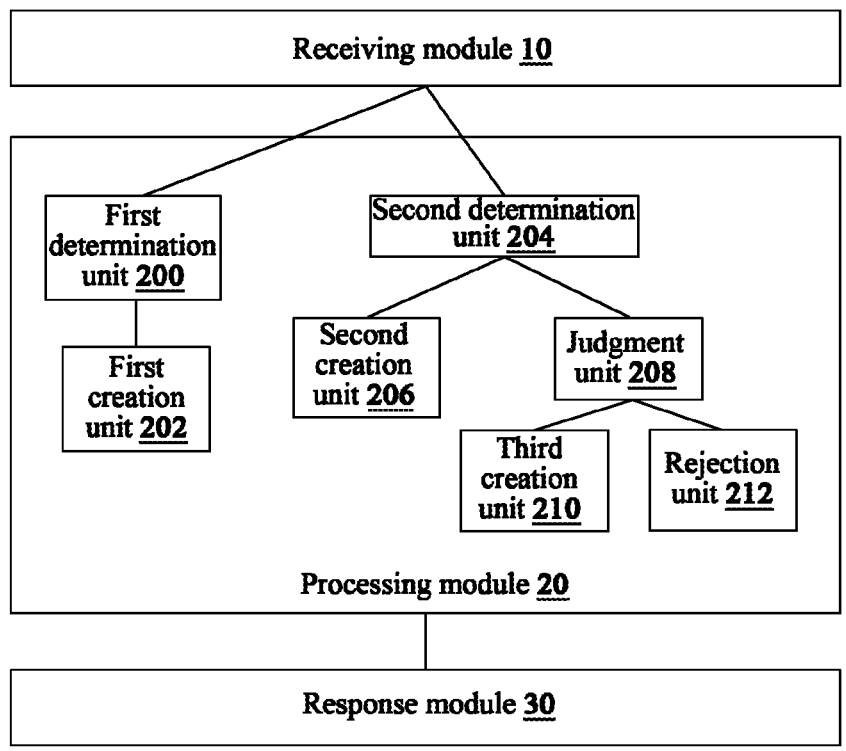
FIG. 4 is a structural block diagram of an apparatus for creating a resource according to an alternative embodiment of the present document.

Herein, as shown in FIG. 4, the above resource creation information may include: a second resource name to be used which is provided by the transmitting end, and a resource creation position; and the processing module 20 may include: a first determination unit 200 configured to determine that there is no resource having the same name as the second resource name in the resource creation position in a case that the transmitting end is verified to have a resource creation authority; and a first creation unit 202 configured to create the resource to be created, herein the name of the resource to be created is the second resource name.

Herein, as shown in FIG. 4, the above resource creation information may include: a second resource name to be used which is provided by the transmitting end, and a resource creation position. The processing module 20 may include: a second determination unit 204 configured to determine that there is a resource having the same name as the second resource name in the resource creation position in the case that the transmitting end is verified to have a resource creation authority; and a second creation unit 206 configured to reallocate the first resource name to the resource to be created and create the resource to be created, herein the first resource name is different from the second resource name.

Herein, as shown in FIG. 4, the above resource creation information may include: a second resource name to be used which is provided by the transmitting end, a resource creation position and a creator. The processing module 20 may include: a second determination unit 204 configured to determine that there is a resource having the same name as the second resource name in the resource creation position in the case that the transmitting end is verified to have a resource creation authority; a judgment unit 208 configured to judge whether a creator of the resource with the same name is the same as the creator of the resource to be created; a third creation unit 210 configured to reallocate the first resource name to the resource to be created and create the resource to be created when an output of the judgment unit is not the same, herein the first resource name is different from the second resource name; and a rejection unit 212 configured to reject to create the resource to be created when the output of the judgment unit is the same.

Herein, as shown in FIG. 4, the above apparatus may further include a response module 30 configured to return a resource creation response to the transmitting end, herein the first resource name is carried in the resource creation response.

It can be seen from the above description that the above embodiments achieve the following technical effects (it needs to be illustrated that these effects are effects which can be achieved by some alternative embodiments): with the technical solutions provided by the embodiments of the present document, after a resource creation request is received from a transmitting end, a resource is not created directly according to resource creation information carried in the resource creation request. And instead, it needs to determine whether a first resource name needs to be reallocated to the resource to be created, and create the resource to be created according to the resource creation information. This solves the problem in the related technology that it is not beneficial for a CSE to manage resources due to the same name of the resource to be created as that of a resource which has already existed. Thereby, the management of resource names by the CSE is enhanced, and the uniqueness of the resource names is ensured, consequently the application scenarios of an M2M service provider are expanded, and at the same time the duplicated registration of the same resources is avoided.

Obviously, those skilled in the art should understand that each module or each step of the aforementioned present document can be implemented with general computing devices, and can be integrated in a single computing device, or distributed onto a network consisting of a plurality of computing devices. Alternatively, each module or each step of the aforementioned present document can be implemented with program codes executable by the computing devices, and therefore, they can be stored in storage devices to be executed by the computing devices. In some cases, the steps illustrated or described may be performed in an order different from that described here; alternatively, they are respectively made into a plurality of integrated circuit modules; alternatively, several modules or steps of them are made into a single integrated circuit module to be implemented. Thus, the present document is not limited to any specific combinations of hardware and software.

The above description is only the alternative embodiments of the present document, which is not used to limit the present document. The present document can have various modifications and changes for the skilled in the art. All the modifications, equivalent substitutions, and improvements, etc. made within the rule and principle of the present document shall fall into the protection scope of the present document.

INDUSTRIAL APPLICABILITY

As described above, the technical solution provided by the above embodiments and the preferred embodiments enhances the management of resource names by a CSE, and ensures the uniqueness of the resource names. Consequently the application scenarios of an M2M service provider are expanded, and at the same time the duplicated registration of the same resources is avoided.

What is claimed is:

1. A method for creating a resource, comprising:
receiving a resource creation request from a transmitting end, wherein information carried in the resource creation request carries resource creation information corresponding to a resource to be created; wherein, the resource creation information comprises: a second resource name to be used by the resource and provided by the transmitting end, and a resource creation position; and determining whether there is another resource having a same name as the second resource name in the resource creation position;

if there is not the another resource having the same name as the second resource name in the resource creation position, creating the resource with the second resource name;

if there is the another resource having the same name as the second resource name in the resource creation position, judging whether a creator of the another resource with the same name as the second resource name in the resource creation position is the same as a creator of the resource to be created; allocating a first resource name different from the second resource name to the resource if the creator of the another resource is not the same as the creator of the resource to be created, and creating the resource with the first resource name; and rejecting creation of the resource to be created if the creator of the another resource is the same as the creator of the resource to be created.

2. The method according to claim 1, wherein, after determining whether a first resource name needs to be allocated to the resource to be created according to the resource creation information, the method further comprises:
returning a resource creation response to the transmitting end, wherein the first resource name is carried in the resource creation response.

3. The method according to claim 1, wherein the transmitting end comprises one of a Common Service Entity, called CSE and an Application Entity, called AE.

4. An apparatus for creating a resource, comprising a processor and a memory containing instructions which, when being implemented, make the processor to:
receive a resource creation request from a transmitting end, wherein information carried in the resource creation request carries resource creation information corresponding to a resource to be created; wherein, the resource creation information comprises: a second resource name to be used by the resource and provided by the transmitting end, and a resource creation position; and determine whether there is another resource having a same name as the second resource name in the resource creation position;

if there is not the another resource having the same name as the second resource name in the resource creation position, create the resource with the second resource name;

if there is the another resource having the same name as the second resource name in the resource creation position, judge whether a creator of the another resource with the same name as the second resource name in the resource creation position is the same as a creator of the resource to be created; allocate a first resource name different from the second resource name to the resource if the creator of the another resource is not the same as the creator of the resource to be created, and create the resource with the first resource name; and reject creation of the resource to be created if the creator of the another resource is the same as the creator of the resource to be created.

5. The apparatus according to claim 4, wherein, the processor is further configured to return a resource creation response to the transmitting end, wherein the first resource name is carried in the resource creation response.

\* \* \* \* \*